March 31, 1964   J. C. COYNE   3,127,595
MONITORING CIRCUIT
Filed May 10, 1962   3 Sheets-Sheet 1

INVENTOR
J. C. COYNE
BY
ATTORNEY

United States Patent Office 3,127,595
Patented Mar. 31, 1964

3,127,595
MONITORING CIRCUIT
James C. Coyne, Columbus, Ohio, assignor to Bell Telephone Laboratories, Incorporated, New York, N.Y., a corporation of New York
Filed May 10, 1962, Ser. No. 193,798
4 Claims. (Cl. 340—267)

This invention relates in general to percussive welding apparatus and, more particularly, to a monitoring circuit therefor.

The welding of metal contacts to wire-spring relays, small circuit boards, and the like, with a high degree of accuracy, reliability, and uniformity, has led to a process known as percussive welding. Such welding utilizes a charge storage circuit to maintain a voltage across the two parts to be welded. One of the parts is clamped to a mechanical appendage, the other, referred to as "the gun," is rapidly propelled toward the stationary part. At a given separation between the parts, an arc discharge is initiated across the gap, thereby heating the opposing surfaces and causing the formation of a thin layer of molten metal on both parts. The arc discharge is finally extinquished when the parts are abrupty brought into contact.

When the process is properly controlled, percussive welding is capable of producing strong, reliable connections between a wide range of terminal metals and wire gauges.

Heretofore, a destructive test has generally been employed to ascertain whether a good or bad percussive weld has been made on small sample manufactured products. Such testing is not only expensive, but it does not assure that all welds being made on an assembly line basis, for example, are as good as the welds which are tested at random. More specifically, it has been found that when a welding proces is not optimized, a long tail develops in a distribution curve of weld strengths. This tail is made up of the relatively weak welds and comprises only a small percentage of the total number of welds in a given distribution. Significantly, however, the overall quality of a population of percussive welds is defined completely in terms of the tail of the distribution. It therefore follows that only a very small percentage of destructive test data yields useful information regarding the incomplete, but normal distribution in the tail. The end result is that in destructive testing, the sample size required to assure a practical degree of weld reliability is normally prohibitive from a cost standpoint. Further, certain articles having contacts welded thereto, either because of their size, complexity, or shape, make destructive welding tests impractical or very difficult to accomplish.

A need thus exists for a non-destructive test which will provide a more complete and reliable check on the quality of a plurality of welds and which will reduce or eliminate the need for the destruction of a finished product. Prior attempts to accomplish this have basically involved the direct measurement of the current or power established during the arc discharge, together with a measurement of the arc duration. It is known that a good weld requires that both terminal electrodes be molten at the time the arc is extinguished and the electrodes are brought into contact. Hence, it has been customary heretofore to ascertain by direct measurement if the current, just prior to arc extinction, was greater than the current at which cooling of the electrodes began. The purpose of such monitoring is to screen out defective welds known as "cold welds." Unfortunately, the circuitry for directly measuring arc current becomes quite complex and expensive because of the inverse square root function involved.

In addition to monitoring the welding cycle to screen out "cold welds," it has also been found that another form of defective weld arises from insufficient burn back. This is particularly true in applications where the moving electrode comprises a feathered wire tip; such a tip effectively concentrates the electrical potential and, thereby, initiates a good arc. If there is insufficient burn back of such a moving electrode, the overall shape of the terminal crater is elliptical. This often results in there being no weld joining the parts in a region between the outer edge of the crater and an inner area which does reach a satisfactory molten state to effect a weld.

Accordingly, it is an object of this invention to simplify and to provide an improvement in monitoring circuitry for ascertaining nondestructively whether a given percussive weld has a high probability of being satisfactory or a high probability of being defective.

It is a further object of this invention to determine, relate, and measure parameters of the welding process, whereby monitoring limits and optimum welding conditions may be established and continuously examined for a succession of welds without requiring the direct measurement of arc current or power during the welding cycle.

It is an additional object of this invention to provide a percussive welding monitoring circuit of unique construction which is both conducive to economical manufacture and compatible with conventional welding fixtures and associated apparatus.

As embodied herein, the monitoring system measures both wire velocity and arc duration during each weld. It also checks the measured values of these parameters to ascertain if they violate either of two inequalities: (1) the product of wire velocity (U) and arc duration ($t_a$) is greater than the sum of tip length and a safety factor, and (2) the arc duration ($t_a$) is less than a maximum allowable arc duration $t_{a(max)}$.

In accordance with the invention, the upper limit $t_{a(max)}$ denotes the minimum current required in terms of the arc duration and the known circuit constants R, L, and C of the particular welding circuit employed. This advantageously obviates the need for measuring the current directly as normally done.

An electronic timer and alarm incorporated in the monitoring circuit of the present invention are utilized to check continuously the measured parameters against the two inequalities and to provide a suitable indication if the measured parameters violate either of those inequalities.

Such a unique form of monitoring the percussive welding process, for reasons set forth in greater detail hereinbelow, advantageously screens out two types of defective welds, namely, "cold welds" and "insufficient burnback welds."

These and other objects, the nature of the present invention, and its various features and advantages will appear more fully upon consideration of the specific illustrative embodiment shown in the accompanying drawings and the following detailed description of the drawings.

Figure 1:
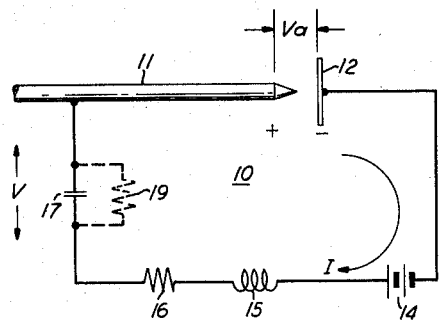
FIG. 1 is a simplified schematic circuit arrangement of a conventional percussion welder showing certain of the circuit elements which are beneficial in understanding the principles of the present invention.

A first requirement that must be fulfilled in order to produce a maximum strength weld is that the distance that the projected wire (contact or electrode) burns back must exceed the length of the wire tip. In order to concentrate the electric potential and initiate a good arc, thereby to insure sufficient burnback, a feathered tip is normally employed. The distance that the wire burns back, hereinafter referred to as burnback ($b$), can be calculated by multiplying the average wire velocity (U) during the arcing period by the duration of the arc ($t_a$).

$$b = U \times t_a \qquad (1)$$

This equation may be expressed in a more tractable form to state that the arc duration ($t_a$) must last longer than the time ($t_v$) required for the wire to travel a prescribed minimum distance $b_{(min)}$, which insures complete burnback. This minimum distance should include not only the length of the feathered tip, but also a distance equal to approximately 0.003″ which allows for a margin of safety. As such, the lower limit of arc duration may be expressed by the following inequality:

$$t_a > t_v \qquad (2)$$

The assumption is made in defining the lower limit of arc duration that the wire tip is touching the adjacent stationary terminal contact or electrode at the time the arc strikes. This is not exactly true; however, the separation is so small that no appreciable error is made by this assumption.

A second requirement that must me fulfilled is that the adjacent surfaces of the wire and terminal must be molten at the time the arc is extinguished and the electrodes come together. This requirement will be met (except in the case of excessive arc dispersion) if the electrical power delivered to the arc always exceeds the heat conduction losses.

This requirement could constitute a criterion for monitoring the welding process; i.e., the current just before arc extinction ($I_m$) could be monitored to assure that it is always greater than the current at which cooling of the welding electrodes began. However, such monitoring presents difficulties and necessitates rather complex and expensive circuitry because of the inverse square root function of current involved during the arc.

Advantageously, the present invention circumvents these and other problems by expressing the minimum current ($I_m$) in terms of the arc duration ($t_a$) and the known circuit constants R, L, and C of the particular percussive welding circuit employed. Significantly, this converts the condition on the lower limit of current to a condition on the maximum time duration $t_{a(max)}$ of the arc, expressed as follows:

$$t_a < t_{a(max)} \qquad (3)$$

The two inequalities set forth in Equations 2 and 3 may be combined to define the upper and lower limits of arc duration as follows:

$$t_v < t_a < t_{a(max)} \qquad (4)$$

These upper and lower limits thus place certain conditions on two parameters of the welding process, namely, that the burnback ($b$) must be greater than some lower limit $b_{(min)}$, which equated to ($t_v$) in Equation 2, and that the duration of the arc ($t_a$) must be less than some upper limit $t_{a(max)}$. Monitoring the percussive welding cycle to insure that these conditions are met involves measurements of both wire velocity and arcing time for each weld. The failure to maintain the arc duration between either the lower or the upper limit results in a corresponding type of weld defect, these being classified herein as an "insufficient burnback weld" and a "cold weld," respectively.

The solution for $t_{a(max)}$ involves functions of seven variables, namely, R, C, K, M, $V_0$, $V_1$, and $V_2$, where R is the series resistance and C is the series capacitance of the particular percussive welding circuit employed, K is a constant dependent on the wire gauge and the properties of the metals to be welded together, $m$ is the slope of the voltage curve during arcing, and $V_0$, $V_1$, and $V_2$ designate the voltages prior to arc initiation, immediately after initiation, and just before extinction, respectively. Since such a solution obviously can not be expressed in closed form, one is left with the choice of either plotting the solutions as families of curves, holding four of the seven variables constant for each family, or deriving an approximate solution. In accordance with the present invention, it has been found that in determining values for I, $V_1$, $V_2$, and $m$, and how these vary with the other welding parameters, that a general, approximate empirical solution for $t_{a(max)}$ is possible which restricts errors to a maximum value of less than 5 percent.

An examination of the basic components involved in a typical percussion welder and the time history of the current and arc voltage waveforms thereof will aid in an understanding of the empirical derivation of $t_{a(max)}$ presented below. Accordingly, reference is first made to FIG. 1 which depicts in simplified schematic form a percussion welder circuit 10 comprising a movable wire electrode 11 and a stationary terminal 12 connected through a circuit comprising a voltage source 14, an inductor 15, a resistor 16, and a capacitor 17, the latter depicted as having a resistor 19, representative of leakage resistance, positioned across it. FIG. 2 depicts typical current and voltage waveforms established by the circuit of FIG. 1. A maximum value of voltage $V_0$ across the air gap abruptly decreases to a value slightly below $V_1$ and the current rapidly increases from zero to a peak value $I_p$ shortly after the initiation of the arc. Both the current and voltage wave forms then decrease (the current in accordance with a modified exponential and the voltage essentially linearly) until they reach the minimum values of $I_m$ and $V_2$, respectively, at arc extinction. The slope of the voltage curve between the values of $V_1$ and $V_2$ is defined as $m$ in the derivations hereinbelow.

Figure 2:
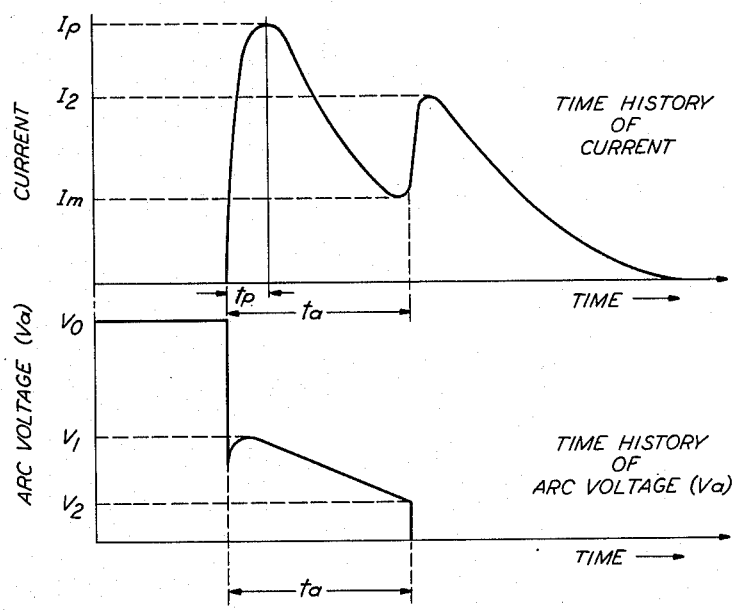
FIG. 2 represents typical time-history curves of current and arc voltage during a percussive welding cycle.

In a circuit of the type depicted in FIG. 1, the power delivered to a weld at any time during the arc is the instantaneous welding current times the instantaneous arc voltage. The power being drawn off the welding electrodes is the instantaneous time rate of heat conduction. As long as the power delivered is greater than the rate of heat conduction, the electrodes continue to melt. When the power delivered becomes less than the rate of heat conduction, solidification begins. The maximum permissible arc duration $t_{a(max)}$ will therefore be defined herein as that time when the power delivered to the arc and the time rate of heat conduction are equal. To determine this value of power, the instantaneous current and voltage, the damping factor, and the properties of the welding electrodes must be ascertained.

It can be shown that the minimum welding current for any RC product due to variations in inductance in a circuit as depicted in FIG. 1, can be taken to be a combination of the two limiting cases of a damping ratio parameter (D), equal either to 1 (critical damping) or to infinity (zero inductance). The instantaneous welding current can therefore be defined by means of a differential equation describing the current flow as a function of time in a well known manner.

From extensive examinations and tests involving the embodied invention, it may be hypothesized that the arc voltage depends primarily on the electrode spacing (distance between wire and terminal) during the arc, and varies directly with the electrode spacing. More specifically, it has been found that (1): Just prior to arc extinction the electrode spacing is almost zero. It can therefore be expected that $V_2$ is always the same for the same electrode metals. (2) The electrode spacing depends upon the difference between the rate of burnback and the wire velocity. Higher wire velocities will decrease the electrode spacing and hence decrease the arc voltage. (3) A blunt wire tip will result in a slower rate of burnback and, hence, decrease the wire voltage.

(4) Increased current will increase the rate of burnback and hence increase the arc voltage.

The voltage at arc initiation is determined by the electrode metals and the electrode spacing for which the air gap will break down. As the arc progresses, the arc voltage first increases (if the burnback rate exceeds the wire velocity) and then decreases as the electrodes come together. This is clearly seen in the voltage curve of FIG. 2.

Accordingly, for purposes of the derivation of $t_{a(max)}$, the following approximations will be made for $V_1$, $V_2$, and $m$. (1) $V_2$ is assumed to be a constant for a given electrode metal. For a copper wire and a nickel-silver terminal, for example, $V_2$ equals approximately ten volts. (2) $V_1$ is chosen to be that value of voltage just after arc initiation which will make the slope ($m$) of the voltage curve just before arc extinction equal to:

$$m = \frac{V_1 - V_2}{t_a} \quad (5)$$

The most conservative estimate of the electrical power being delivered to the weld immediately before arc extinction can therefore be defined as the product of the voltage at arc extinction and the lower of the two values of current at that instant, determined for critical damping ($D=1$) and zero circuit inductance ($D=\infty$). This power must be equated to the rate of heat conduction for a single electrode. This necessitates taking into account the wire gauge and the properties of the metals to be welded. In a particular welding operation, of course, it must also be ascertained which electrode actually cools more rapidly. In the majority of instances involving copper wire, for example, the wire electrode presents the greater hazard of premature solidifying since the thermoconductivity of copper is large (ten times larger than nickel-silver and three times larger then brass). Other factors to be considered are the larger heat conducting area in the terminal and, conversely, the larger mass of molten material in the terminal to be cooled.

Values for the series resistance and capacitance of the particular welding circuit employed may be accurately ascertained by resort to any one of a number of well known measuring techniques or through circuit analysis.

With the aforementioned variable and constant percussive arc welding parameters ascertained or approximated, an expression for $t_{a(max)}$ may then be derived as follows: In accordance with the invention, the range of arc duration of interest is for values of $t/RC$ from approximately 2 to 4. A three-point approximation for the solution of $t_{a(max)}$ may thus be derived which is exact at $t/RC$ equal to the integers 2, 3, and 4. The approximate equation for this solution then takes the form of the first three terms of a power series expressed as follows:

$$A_1 \tau^2 - 2A_2 \tau + A_3 = 0 \quad (6)$$

where $$\tau = \frac{t_{a(max)}}{RC} \quad (7)$$

and where $A_1$, $A_2$, and $A_3$ are constants to be determined for the particular type of damping employed.

For the case of critical damping, for example, it can be shown that the constants may be evaluated as follows:

$$A_1 = .05745 \frac{V_0 - V_1}{V_1 - V_2} + .00315 \quad (8)$$

$$A_2 = .22148 \frac{V_0 - V_1}{V_1 - V_2} + .04543 \quad (9)$$

$$A_3 + .8642 \frac{V_0 - V_1}{V_1 - V_2} + .8155 - \frac{2K\sqrt{RC}}{CV_2(V_1 - V_2)} \quad (10)$$

The solution for $t_{a(max)}$ therefore becomes:

$$t_{a(max)} = RC \left\{ \frac{A_2}{A_1} - \sqrt{\left(\frac{A_2}{A_1}\right)^2 - \frac{A_3}{A_1}} \right\} \quad (11)$$

A three-point approximation for the solution of the RC decay condition ($D=\infty$) is derived in the same way. The solution for $t_{a(max)}$ is again represented by Equation 11, but with the following set of constants applicable to the case of zero inductance.

$$A_1 = .02778 \frac{V_0 - V_1}{V_1 - V_2} + .002515 \quad (12)$$

$$A_2 = .12203 \frac{V_0 - V_1}{V_1 - V_2} + .03769 \quad (13)$$

$$A_3 = .56839 \frac{V_0 - V_1}{V_1 - V_2} + .75210 - \frac{2K\sqrt{RC}}{CV_2(V_1 - V_2)} \quad (14)$$

It is thus seen that Equation 11 allows the maximum permissible arc duration to be predicted for either of the limiting cases considered above. This equation is advantageously generalized to include the different values of constants that will arise because of different welding metals and wire gauges. Care should of course be taken to insure that the entire surface of the projected wire end makes contact with the terminal at the same time. More specifically, the time between initial contact and full area contact must be less than the solidification time.

It should also be noted that in order for burnback to have real significance in accordance with the principles of the invention, the length of the wire tip and the tip geometry must be consistent from weld to weld. The more consistent the wire tip, the more reliable will be the screening of defective welds. This requirement should not impose an additional burden on production since consistent tip dimensions are a necessity for reliable product control, even if a monitoring system such as embodied herein, were not employed. Concomitantly, as a definite correlation has been found to exist between tip shape and weld strength, the shape of the tip should comprise one of several known designs which are conducive to the attainment of optimum strength welds. Of various tip configurations investigated, the best results appear to be obtained with conical or pyramidal (axially symmetric) tips. These tips, however, are quite difficult to make on an assembly line basis. Accordingly, various forms of a feathered tip, which do not have axial symmetry, but do have symmetry about the $x$—$y$ axis, are normally used at present. Some of these feathered tips have proven to give very good results and are relatively easy to make.

A corollary to a well chosen tip geometry is that it will give rise to a resultant terminal crater which has the same geometry as the burned-away wire end. To have this property, the tip geometry should be symmetrical and rectilinear with the axis of the wire. Tip symmetry aids in concentrating the melting within the stationary terminal into a circular area, while the rectilinear orientation is necessary in order that the deeper melting occurs at the center of this area. As previously mentioned, a conical or pyramidal tip most nearly has these properties, but a well designed feathered tip can also exhibit these properties to a satisfactory degree.

Having analyzed the monitoring criterion and discussed certain collateral design aspects of the welding electrodes which may affect its reliability, a description of a unique electrical circuit to implement such monitoring will now be given.

Figure 3:
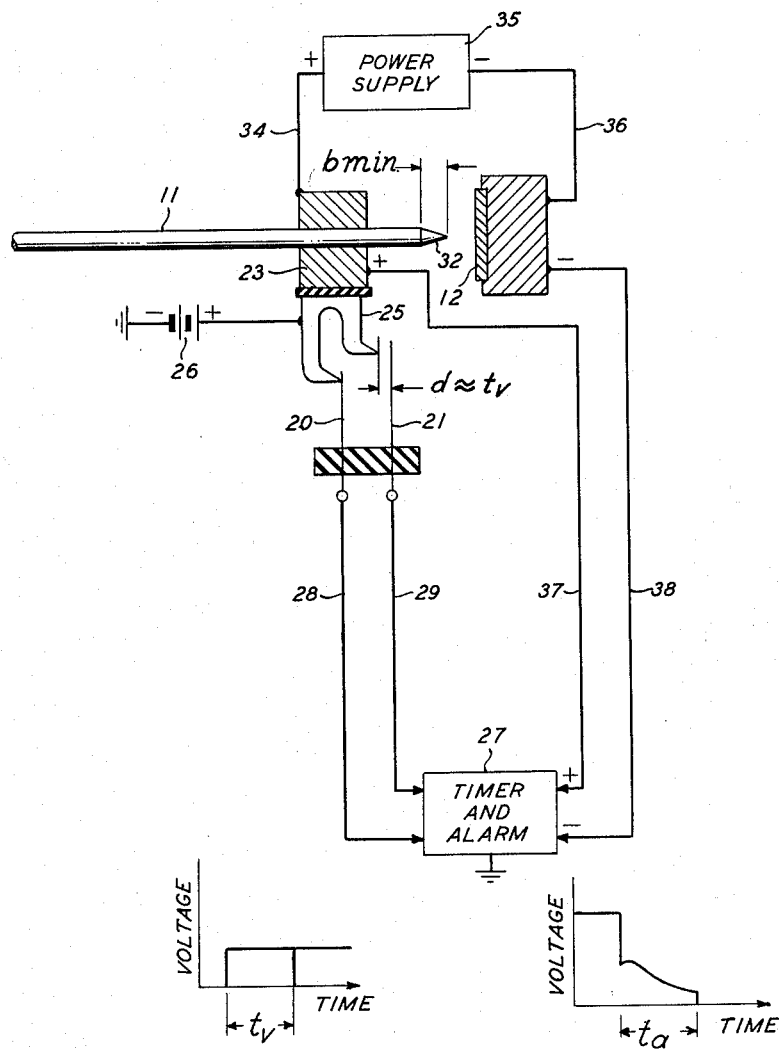
FIG. 3 is a schematic arrangement of a percussion welder monitoring circuit embodying the principles of this invention.

FIG. 3 depicts a monitoring circuit in accordance with the principles of the invention which measures the arc duration of each weld and ascertains whether it remains within the lower limit ($t_v$) and the upper limit $t_{a(max)}$. In addition to the movable wire electrode 11 and stationary terminal electrode 12 shown in FIG. 1, two electrical contacts 20 and 21 are placed along the path of travel of a wire jaw 23, which is a part of the particular welding fixture employed. Attached to the wire jaw is a positively biased two-prong electrode 25, biased by a voltage source 26. Two leads 28 and 29, respectively, connect contacts 20 and 21 to different inputs of a timer and alarm circuit 27, shown in block diagram form in FIG. 3, and in detail in FIG. 4. An electrical circuit is thereby completed from the source 26 through the electrode 25, and either of contacts 20 and 21 to the timer and alarm 27.

The contacts 20 and 21 are spaced with respect to the prongs of electrode 25 such that in operation a distance $b_{(min)}$ is established which (1) provides preselected step voltage functions on leads 28 and 29 which together are indicative of $(t_v)$ at different inputs of the timer and alarm 27 and, (2) assures that a suitable feathered wire tip 32 will burn back completely a distance $(b)$ plus approximately 0.003″ which allows for a margin of safety.

A welding lead 34 connects the movable wire jaw 23 to one side of a power supply 35 and a lead 36 connects the other side of the power supply to the stationary electrode 12. The power supply is adjusted to establish a bias voltage across electrodes 11 and 12 of a magnitude sufficient to initiate an arc at a prescribed separation therebetween. Two leads 37 and 38 connect the movable wire jaw 23 and the stationary electrode 12, respectively, to different inputs of the timer and alarm 27. The wire jaw 23 is preferably connected to the positive terminal of the power supply 35, as shown, and also to the positive input terminal of the timer and alarm 27. The negative terminal of power supply 35 is converted, via stationary electrode 12, for example, to the negative input terminal of timer and alarm 27. In operation, the voltage transitions established at arc initiation and extinction are utilized to define a time interval indicative of the arc duration $(t_a)$. The voltage wave forms indicative of $(t_v)$ and $(t_a)$ are shown plotted as functions of time adjacent the associated inputs of the timer and alarm 27. It of course is obvious that a coil magnetically coupled to welding lead 34, for example, could be utilized to provide voltage indications indicative of the beginning and end of each arc. Similarly, a voltage divider network could be connected to contacts 20 and 21 so as to produce step voltages indicative of $(t_v)$ with only a single input to the timer and alarm being required.

The timer and alarm may comprise any suitable apparatus capable of measuring and determining whether $t_a > t_v$ and $t_a < t_{a(max)}$. If the arc duration $(t_a)$ does not remain within the prescribed limits in accordance with the principles of the invention, the alarm is actuated.

Figure 4:
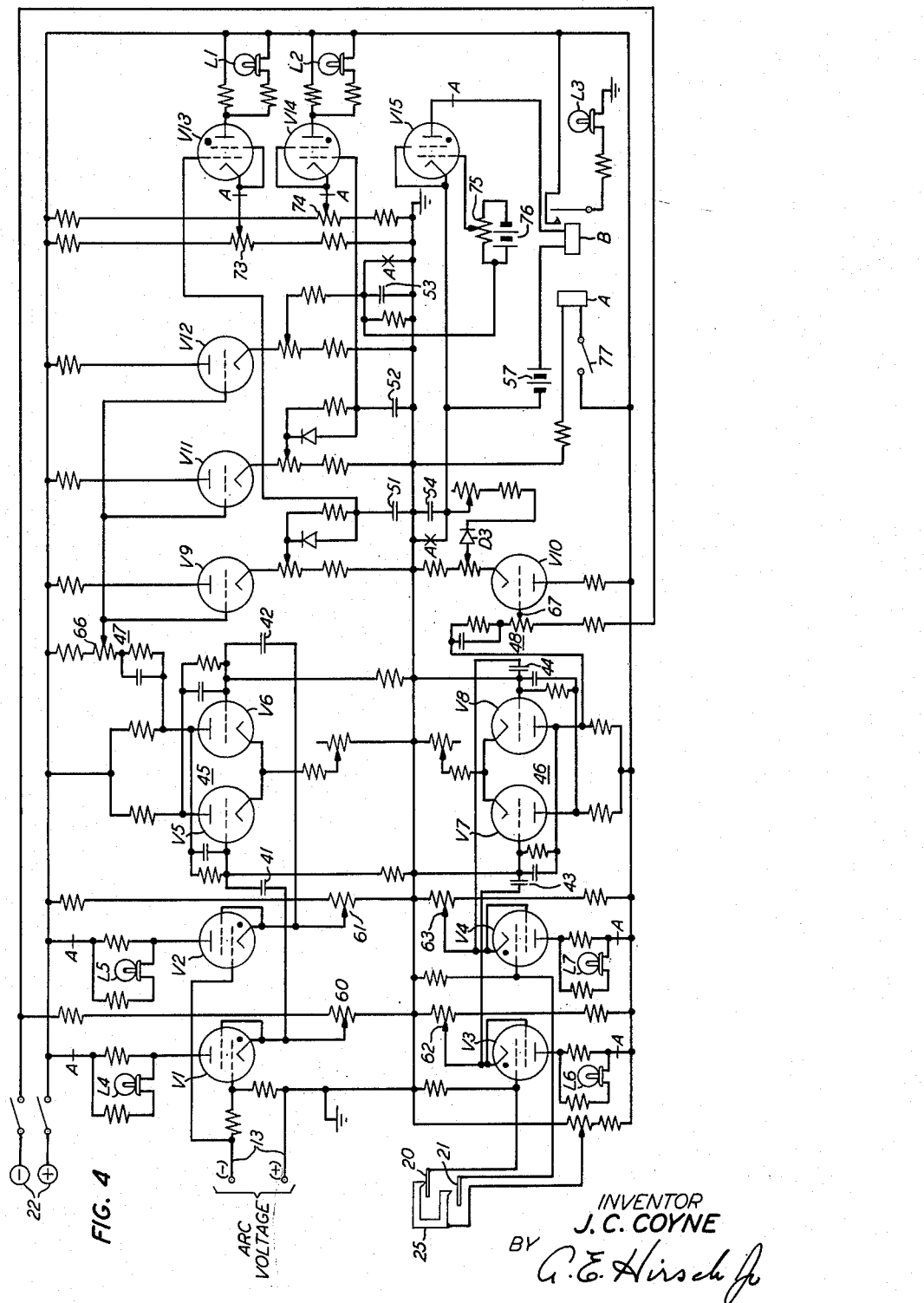
FIG. 4 is a detailed diagrammatic arrangement of one portion of the monitoring circuit depicted in FIG. 3.

FIG. 4 depicts in schematic form, a detailed embodiment of a timer and alarm circuit which is applicable for use in the monitoring circuit of FIG. 3. The circuit comprises one pair of thyratrons V1 and V2 selectively responsive to the abrupt changes in arc voltage supplied by terminals 13 to the grids of V1 and V2. Two capacitors 41 and 42 connect the cathodes of V1 and V2, respectively, to the grids of V5 and V6, comprising a first multivibrator 45. The plate of V6 is direct-current coupled through a voltage divider network 47 to the grids of cathode followers V9, V11, and V12.

A second pair of thyratrons V3 and V4 is selectively responsive to the potentials associated with contacts 20 and 21 positioned along the path of the positively biased and movable two-prong electrode 25. More specifically, the step voltages successively established on contacts 20 and 21 are applied to the grids of V3 and V4, respectively. Two capacitors 43 and 44 connect the cathodes of thyratrons V3 and V4, respectively, to the grids of V7 and V8 comprising a second multivibrator 46. The plate of V8 is direct-current coupled through a voltage dividing network 48 to the grid of a cathode follower V10. Direct-current bias voltages for most of the various circuit elements are supplied by an energizing source 22.

The output of each cathode follower approximates a constant current source for a number of integrating capacitors 51, 52, 53, and 54. More specifically, the voltage developed across capacitor 51 is applied to the grid of thyratron V13 which ignites and actuates a suitable alarm, such as the neon lamp L1, if $t_a$ exceeds the upper limit of arc duration $t_{a(max)}$. Similarly, the voltage developed across capacitor 52 is applied to the grid of a thyratron V14 which ignites and lights a neon lamp L2 if the arc duration is longer than an adjustable limit $t_{a(min)}$. This accessory circuit is used to evaluate welds at various minimum values of arc duration time $(t_a)$ independent of the burnback limit $(t_v)$.

The voltages developed across capacitors 53 and 54 are respectively applied to the control grid and cathode of thyratron V15. If the total voltage across capacitor 53 exceeds that across capacitor 54 as the contacts 20 and 21 are successively connected to the timer input, V15 ignites and operates a light L3 through a relay B. This provides both a measurement and an indication of the inequality $t_a > t_v$. A separate isolated plate supply 57 in series with relay B is shown for biasing V15. A suitable power supply with separate transformer windings could, of course, be utilized for biasing all of the circuit elements in actual practice.

Certain of the other circuit elements and their functions which are believed to be of interest will be described in connection with the following description of the operation of the monitoring circuit.

The measurement of arc duration $(t_a)$ is accomplished by taking advantage of the abrupt voltage transitions developed across the electrodes at arc initiation and extinction, as seen in FIG. 2. By way of example, in one typical welding circuit, the arc voltage decreases nearly instantaneously from 50 volts to approximately 20 volts when the arc is initiated, and from approximately ten volts to zero when the arc is extinguished. With the positive welding electrode and the timer and alarm circuit connected to a common ground, the negative electrode is then capable of increasing the control grid voltage on thyratrons V1 and V2.

Variable resistors 60 and 61 are initially adjusted so that the negative cathode voltages are sufficient to ignite V1 and V2 when the arc voltage attains values, for example, of approximately 35 volts and five volts, respectively. These settings are not critical in most cases. Neon lamps L4 and L5 are utilized, if desired, to indicate that the tubes associated therewith have fired.

The two spaced contacts 20 and 21, most clearly seen in FIG. 3, are respectively wired to the control grids of thyratrons V3 and V4. As the moving contacts complete each circuit, the corresponding thyratrons V3 and V4 are fired. Thyratrons are employed in this part of the alarm circuit in order to achieve indications of first contact without encountering problems of contact chatter. The cathodes of V3 and V4 are biased positively with variable resistors 62 and 63, respectively. Neon lamps L6 and L7 are utilized, if desired, to indicate if tubes V3 and V4 have fired.

The voltage rises established at the cathodes of thyratrons V1 and V2, caused by the arc voltage step functions applied to the grids, are utilized to activate the bistable multiplier 45 comprising V5 and V6 in a manner which provides an accurate measurement of the arc duration $(t_a)$. Similarly, the voltage rises established at the cathodes of V3 and V4, caused by the step voltages applied to the grids from the spaced contacts 20 and 21, respectively, are utilized to activate the bistable multivibrator 46 comprising V7 and V8 in a manner which provides an accurate measurement of the arc duration $(t_v)$. More specifically, when the arc strikes, V1 fires, causing V5 to conduct and V6 to cut off in multivibrator 45 in a well known manner. Consequently, the voltage at the plate of V6 rises to approximately 300 volts. When the arc is extinguished, V2 fires, causing multivibrator 45 to return to its initial state and causing the plate voltage of V6 to drop back to a conducting potential of about 200 volts. A similar sequence of events occurs with the multivibrator 46 comprising V7 and V8 for the measurement of $(t_v)$. The plate voltage of V8 rises to approximately 300 volts during this time measurement interval. The conduction time of the multivibrators should be adjusted to be as short as possible.

With V6 and V8 conducting, potentiometers 66 and 67 respectively associated therewith are adjusted such that the direct-current coupled cathode followers V9, V10, V11, and V12 are cut off. This corresponds to the initial quiescent state of the circuit. Conversely, when the multivibrators change states, the cathode followers become grid biased positively and start conducting. The output of each cathode follower approximates a constant current source for the integrating capacitors 51 through 54. When the multivibrators return to their original states, at the end of the $t_a$ or $t_v$ time intervals with which they are respectively associated, the cathode followers cut off again. At this time, the voltages on capacitors 51, 52, and 53 are all involved in the measurement of the arc duration $t_a$, and the voltage on capacitor 54 is a measure of the lower time limit $t_v$.

The measurements of the upper and lower limits for $(t_a)$ will now be considered in greater detail. The voltage developed across suitably chosen capacitor 51 is utilized to determine if the arc duration exceeds the inequality $t_a > t_{a(max)}$, i.e., the upper allowable limit. This voltage is directly applied to the grid of thyratron V13. Positive cathode voltage for V13 is adjusted by a variable resistor 73, such that V13 fires and neon lamp L1 lights if $(t_a)$ exceeds the upper limit. Similarly, the voltage developed across suitably chosen capacitor 52 fires thyratron V14 and lights neon lamp L2 if the arc duration is longer than an adjustable lower allowable limit $t_{a(min)}$. Positive cathode voltage for V14 is adjusted with a variable resistor 74.

The second inequality, $t_a > t_v$, is measured and indicated in the following manner: The voltage developed across capacitor 53, which is representative of $(t_a)$, and the voltage developed across capacitor 54, which is representative of $t_v$, are applied to the control grid and to the cathode, respectively, of thyratron V15. Assuming that the first velocity measuring contact 20 closes before the arc strikes, which it is initially set to do, then the cathode of V15 is initially driven positively with respect to the grid. When the arc strikes, the grid also starts going positive. A variable resistor 75 connected across a bias source 76 is adjusted such that V15 fires and operates light L3 through relay B if the total voltage increase across capacitor 53 exceeds that across capacitor 54, thus indicating that $t_a$ is greater than $t_v$. A diode D3 is employed to prevent the voltage on capacitor 54 from leaking back to ground after tube V10 cuts out.

The timer and alarm circuit is reset after each weld is made and the appropriate lights energized through the actuation of a voltage supply switch 77, which operates a relay A and clears all the thyratrons, by opening the plate cathode circuits, e.g. the plate circuits of V1, V2, V3, V4, and V15, and the cathode circuits of V13 and V14, in addition to providing a leakage path for the voltages developed across capacitors 53 and 54. The normally "open" and normally "closed" conditions of the detached contacts for both relays A and B are identified by well known symbols; an "X" or a perpendicular line respectively superimposed on the appropriate circuit leads.

In summary, a percussive welding monitoring criteria has been disclosed together with a unique circuit to implement it, which screens out two types of defective welds, namely, "cold welds" and "insufficient burn-back welds." The monitoring is based on measurements of wire velocity and arc duration for each weld and on the checking of these measurements electronically to ascertain if they violate either of two inequalities. An electronic timer and alarm incorporated in the monitoring circuit continuously checks the measured parameters against the inequalities and if either inequality is violated, the alarm is actuated. Such monitoring is accomplished without necessitating the direct measurement of the current drawn during the arc.

It is to be uunderstood that the specific embodiment together with its mode of operation described herein is merely illustrative of the general principles of the instant invention. Numerous other structural arrangements and modifications may be devised in the light of this disclosure by those skilled in the art without departing from the spirit and scope of this invention.

What is claimed is:

1. In a percussive welding system wherein a movable fixture projects one welding member rapidly toward another member, biasing means connected to said members for initiating an arc therebetween at a prescribed separation, apparatus for monitoring and determining whether a satisfactory or defective weld has been made, said apparatus comprising in combination means for measuring the time $(t_v)$ required for said moving member to traverse a prescribed distance $b_{(min)}$, means for measuring the arc duration $(t_a)$, means for comparing the time $(t_a)$ both with said time $(t_v)$ and with a predetermined time $t_{a(max)}$, and alarm means actuated by said comparing means whenever values of $(t_a)$ are less than $(t_v)$ and whenever values of $(t_a)$ are greater than $t_{a(max)}$.

2. Apparatus in accordance with claim 1 wherein said means for measuring the time $(t_v)$ comprises two spaced electrodes positioned along the path of travel of said movable fixture, and a positively biased conductive member comprising two outwardly extending prongs attached to said movable fixture, said electrodes being spaced with respect to said prongs such that the distance traversed by said prongs in making first and second contact with said electrodes defines said prescribed distance $b_{(min)}$, said prongs establishing successive and respective step voltages on said electrodes such that the time interval between successive voltages is indicative of $(t_v)$.

3. In a percussive welding system wherein a movable fixture projects one electrode rapidly toward another electrode, biasing means connected to said electrodes for initiating an arc therebetween at a prescribed separation, apparatus for monitoring and determining whether a satisfactory or defective weld has been made, said apparatus comprising differential timer means, means for measuring the time $(t_v)$ required for said moving electrode to traverse a prescribed minimum distance $b_{(min)}$, said means comprising two spaced stationary electrodes positioned along the path of travel of said movable fixture and electrically connected to said timer means, a positively biased electrode comprising two outwardly extending prongs attached to said movable fixture, said stationary electrodes being spaced with respect to said prongs such that the distance traversed by said prongs in making first and second contact with said electrodes defines said prescribed distance $b_{(min)}$, said first and second contacts establishing successive and respective step voltages on said electrodes which together define a time interval indicative of $(t_v)$, means connected to said welding electrodes and to said timer means for providing successive voltage transitions which together define the arc duration $(t_a)$, said differential timer means comparing the time $(t_a)$ with said time $(t_v)$ and comparing the time $(t_a)$ with a predetermined time $t_{a(max)}$, and alarm means responsive to signals in and actuated by said timer for values of $(t_a)$ less than $(t_v)$ and for values of $(t_a)$ greater than $t_{a(max)}$.

4. In a percussive welding system wherein a movable fixture projects one conductive member rapidly toward another member; means connected to said members for initiating an arc at a prescribed distance therebetween; first means for providing first electrical indications representative of the initiation and extinction of said arc; second means for providing second electrical indications identifying both the instant that said movable member is projected toward the other of said members and the instant that it has traversed a prescribed distance; third means electrically connected to said first and said second means and supplied with said first and said second electrical indications for developing a third electrical indication representative of the duration of said arc, a fourth electrical indication representative of the distance said movable member has traversed, and a fifth electrical indication representative of a predetermined maximum allowable time of arc duration; and electrical alarm means responsive to said fourth and said fifth electrical indications for indicating that said arc duration is not within a permissible time interval.

No references cited.